May 14, 1929.  J. FAVATA, JR  1,712,986

HOLDER FOR FLOWERPOTS AND CUT FLOWERS

Filed July 11, 1927

Witness:
J. Oberst.

Joseph Favata, Jr., Inventor.
By Emil Neuhart
Attorney.

Patented May 14, 1929.

1,712,986

UNITED STATES PATENT OFFICE.

JOSEPH FAVATA, JR., OF BUFFALO, NEW YORK.

HOLDER FOR FLOWERPOTS AND CUT FLOWERS.

Application filed July 11, 1927. Serial No. 204,790.

My invention relates to a holder for flower pots and cut flowers, and it has for its primary object the provision of a device particularly adapted for cemetery use to enable potted flowers to be permanently positioned on or adjacent graves, with assurance that a supply of water will be provided over a long period of time to keep the flowers moistened; this being particularly desirable, owing to the fact that potted plants require constant watering in order to keep them in condition, and it is oftentimes found extremely inconvenient, especially in large cities where cemeteries are in remote sections, to water the potted plants as often as required.

A further object of my invention is, to provide a water supply for potted plants, and to make provision for surrounding the potted plants with cut flowers, the stems of which will be partly submerged within the water provided for moistening the ground within the pot of the potted plant.

A still further object of my invention is, to provide a novel holder for potted plants, wherein provision is made to accumulate rain water and deliver the same into the water reservoir of the device, so that manual replenishment of the water is not required, except during dry spells.

A still further object of my invention is the provision of novel means for supporting the device and securing it in a fixed position over a grave.

Further objects of my invention will appear hereinafter.

The invention consists in the novel features of construction and in the arrangement and combination of parts to be hereinafter described and more particularly pointed out in the subjoined claims.

Figure 1:
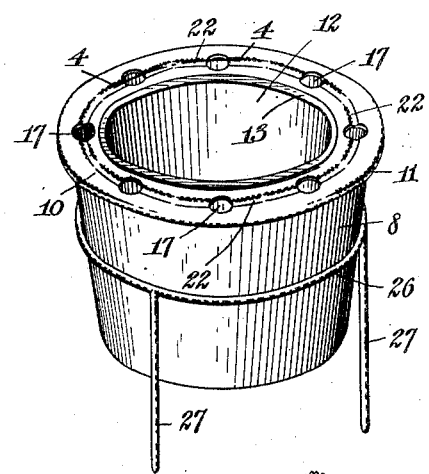
Fig. 1 is a perspective view of the complete device.
Figure 3:
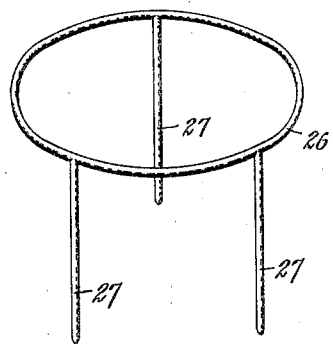
Fig. 3 is a detached perspective view of the support for the holder proper.

The device comprises an outer receptacle or water container 8, which may be constructed of sheet metal or other suitable material. This receptacle or container is made water-tight and preferably tapered downwardly to conform to the shape of the conventional flower pot. The peripheral wall of this receptacle or container has an outstanding flange 9 at its upper end and a rim or annulus 10 extends inwardly from said upper end and has its outer marginal portion curved around the flange 9, as at 11. This rim provides a central opening through which an inner bottomless pot-retainer 12 is passed, which is preferably constructed of sheet metal or other material impervious to water. This pot-retainer is tapered downwardly and the upper end thereof is provided with an outstanding flange 13, which rests against the inner marginal portion of the rim or annulus 10, and thus receives support therefrom.

The pot-retainer 12 is somewhat shorter than the water container 8 in which it is centrally arranged, and the wall thereof is separated from the peripheral wall of said water container by an annular intervening space 14. By reason of the pot-retainer 12 being shorter than the water retainer, the lower end thereof is spaced from the bottom of said water container.

The pot 15 of a potted plant is fitted into the pot-retainer 12 and as flower pots are invariably provided with thickened portions at their upper ends, a downwardly facing shoulder 16 is provided on the conventional flower pot; this shoulder being adapted to rest against the upper end of the pot-retainer so as to properly position the potted plant within the holder. The outer peripheral surface of the pot, which is also tapered downwardly, is in contact at all points beneath its thickened upper portion with the inner surface of the pot-retainer and is therefore firmly wedged within said retainer. As flower pots of the conventional type are formed of porous material, the ground therein, when the pot is inserted in the pot-retainer, is moistened only from the bottom; no water finding its way to the ground through the wall of the pot-retainer, which also acts as a shield. In this manner the pot-retainer serves to prevent the feeding of water to the plant in excessive quantities, and as it is known that an oversupply of water to most plants is objectionable, the construction of my improved device has decided advantages over others now known to me.

Figure 2:
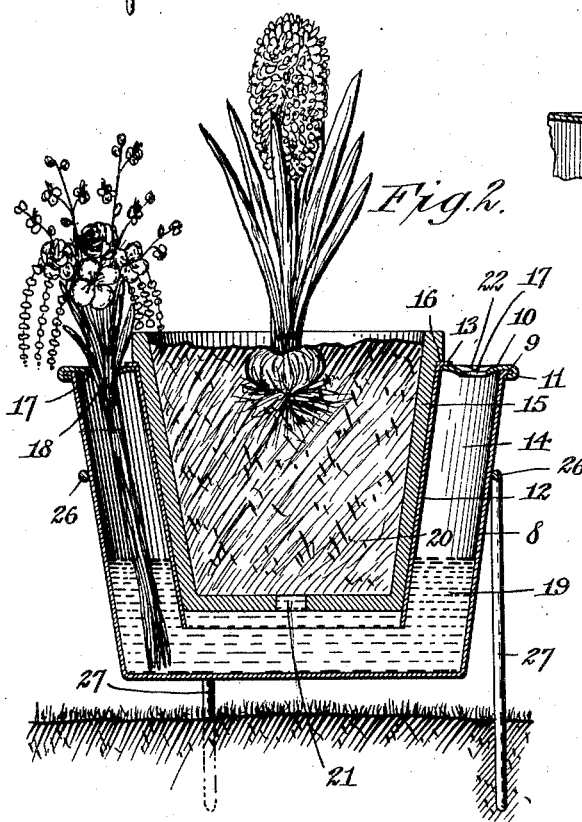
Fig. 2 is a central vertical section of the same showing a potted plant placed therein and cut flowers inserted through the perforated rim at the upper end thereof.
Figure 4:
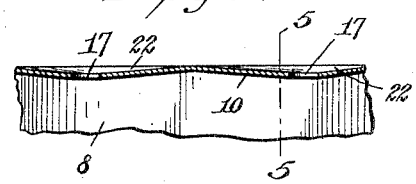
Fig. 4 is a circumferential section taken through a portion of the rim at the top of the holder, as indicated by line 4—4, Fig. 1.
Figure 5:
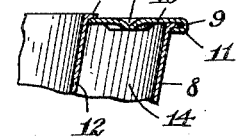
Fig. 5 is a cross section taken on line 5—5, Fig. 4.
Figure 6:
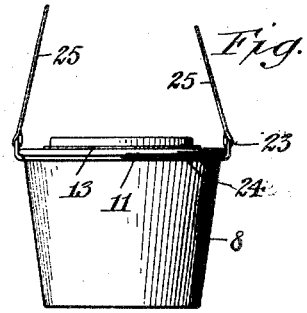
Fig. 6 is a side elevation of the device, showing the same suspended from a hanger which may be fastened to the ceiling or any other elevated object.

The rim or annulus 10 is provided with a circular series of openings 17 through which the stems of cut flowers may be passed, as shown at 18, Fig. 2. Thus, the potted plant will be surrounded by several clusters of cut flowers, and water, indicated by the numeral 19, Fig. 2, is placed within the container 8 to the desired level, depending on the length of the stems which the cut flowers have; the purpose being to have the stems of the cut flowers extend into the water and thus be kept in a fresh condition. The water within the receptacle 8 also keeps the ground 20 of the potted plant in moist condition so that the potted plant will be maintained in good condition over a long period of time; this being accomplished by reason of the fact that the conventional flower pot has an opening 21 in its bottom, through which water or moisture may pass.

Between the openings 17 in the rim or annulus 10, grooves or troughs 22 are formed, these becoming gradually deeper from points midway between the openings to said openings, so that during rainy weather the rain water accumulating on the rim or annulus will flow from these grooves through the openings into the container 8 and replenish or add to the supply within said receptacle. By reason of this arrangement the openings 17 are in a slightly lower plane than the marginal portions of the rim or annulus.

The device thus far described may be placed upon a table or other suitable support, or it may be suspended from a high point, in which case a hanger 23 is provided, comprising a ring 24, which surrounds the receptacle and is in contact with the under side of the curved portion 11 at the outer marginal portion of the rim or annulus 10; said curved portion, with the flange 9 embraced thereby, forming a bead at the upper edge of the device, which rests against the ring 24 of the hanger. This ring has wires, or other suspending elements 25 fastened thereto, which may be brought to a common point for attachment to a ceiling or some other elevated object.

However, as the device is particularly adapted for use in cemeteries I have provided a support for the flowerpot and flower holder, which is adapted to be fastened into the usually elevated portion or mound of a grave, or into the ground adjacent the grave. This support is preferably constructed of wire and comprises a ring 26 of somewhat smaller diameter than the large upper portion of the water container 8, and a plurality of legs 27 welded or otherwise connected to said ring and which may be driven into the ground.

The container 8 is placed within the ring and receives support therefrom at some point between its upper and lower ends. The bottom of the container 8 may rest upon the ground, or be slightly elevated therefrom, as shown in Fig. 2.

Having thus described my invention, what I claim is:—

1. A device of the kind described, comprising a water container having an outstanding flange at its upper end, a rim extending inwardly from the wall of said water container at its upper end and having its outer marginal portion curved around said flange, said rim being provided with a circular series of openings and grooves between said openings, each groove being inclined from a point between two openings downwardly towards said openings, and a pot-retainer comprising a downwardly-tapering open-ended member provided with an outstanding flange at its upper end resting upon the inner marginal portion of said rim, the lower end of said pot-retainer being spaced from the bottom of said water container.

2. A device of the kind described, comprising a water container having a rim at its upper end extending inwardly from its peripheral wall, said rim being adapted to support a flower pot entered into said container, a downwardly-tapering open-bottom pot-retainer arranged within said container and adapted to have a downwardly-tapering flower pot placed therein with the outer surface of the wall of said pot in contact with the wall of said pot-retainer, said pot-retainer being supported by said rim.

3. A device of the kind described, comprising a water container having a rim at its upper end extending inwardly from its peripheral wall, a downwardly-tapering pot-retainer provided with an outstanding flange at its upper end resting against the inner marginal portion of said rim only and arranged within said container and adapted to have a flower pot placed therein, said pot-retainer preventing water entering the flower pot through its sides and said rim having a series of openings therein for the passage therethrough of stems of cut flowers.

4. A device of the kind described, comprising a water container, an open-bottom downwardly-tapering pot-retainer arranged centrally within said water container and terminating short of the bottom thereof, said pot-retainer being adapted to receive a correspondingly-tapered flower pot and serving as a shield for the side wall of said pot to prevent the passage of water therethrough; and being further supported from the upper end of said water container and separated from the peripheral wall of said container by an intervening space.

5. A device of the kind described, comprising a water container having an inwardly-directed rim at its upper end provided with a circular series of openings and grooves between said openings adapted to drain rain water into said openings and an open-bottom downwardly-tapering pot-retainer adapted to receive a correspondingly tapered flower pot and receiving support from said rim, the lower end of said pot-retainer terminating above the bottom of said water container and the peripheral wall of said pot-retainer contacting with the outer surface of said pot to prevent water passing through the peripheral wall of said pot, the openings in said rim being adapted to have the stems of cut flowers passed therethrough so as to enter the water within said water container.

In testimony whereof I affix my signature.

JOSEPH FAVATA, Jr.